United States Patent
Beitelmal et al.

(10) Patent No.: US 10,207,935 B2
(45) Date of Patent: Feb. 19, 2019

(54) HYBRID DESALINATION SYSTEM

(71) Applicant: QATAR FOUNDATION FOR EDUCATION, SCIENCE AND COMMUNITY DEVELOPMENT, Doha (QA)

(72) Inventors: Abdlmonem Beitelmal, Doha (QA); Mohammad Khaleel, Doha (QA)

(73) Assignee: Qatar Foundation For Education, Science and Community Development, Doha (QA)

(*) Notice: Subject to any disclaimer, the term of this patent is extended or adjusted under 35 U.S.C. 154(b) by 136 days.

(21) Appl. No.: 15/421,381

(22) Filed: Jan. 31, 2017

(65) Prior Publication Data

US 2017/0217789 A1   Aug. 3, 2017

Related U.S. Application Data

(60) Provisional application No. 62/289,275, filed on Jan. 31, 2016.

(51) Int. Cl.
*C02F 1/14* (2006.01)
*C02F 1/44* (2006.01)
(Continued)

(52) U.S. Cl.
CPC .............. *C02F 1/14* (2013.01); *B01D 1/0035* (2013.01); *B01D 1/0047* (2013.01); *B01D 1/0052* (2013.01); *B01D 3/145* (2013.01); *B01D 3/42* (2013.01); *B01D 61/002* (2013.01); *B01D 61/025* (2013.01); *B01D 61/12* (2013.01); *B01D 61/58* (2013.01); *B01L 3/02* (2013.01); *C02F 1/441* (2013.01); *C02F 1/445* (2013.01); *B01D 2311/06* (2013.01); *B01D 2313/36* (2013.01);
(Continued)

(58) Field of Classification Search
CPC ....... C02F 1/14; B01D 1/0035; B01D 1/0047; B01D 1/0052; B01D 3/02; B01D 3/145; B01D 3/43
See application file for complete search history.

(56) References Cited

U.S. PATENT DOCUMENTS

| 4,083,781 A * | 4/1978 | Conger | ................ B01D 61/022 |
| | | | 210/651 |
| 6,294,054 B1 * | 9/2001 | Sutter | ...................... B01D 3/10 |
| | | | 202/176 |

(Continued)

FOREIGN PATENT DOCUMENTS

WO    WO 99/61125 A1    12/1999

OTHER PUBLICATIONS

Zachary et al., "Adding Desalination to Solar Hybrid and Fossil Plants," Power Magazine, May 1, 2010.

*Primary Examiner* — Jonathan Miller
(74) *Attorney, Agent, or Firm* — Richard C. Litman

(57) ABSTRACT

The hybrid desalination system is a desalination system for seawater which uses both filtering and treatment from a reverse osmosis filter system as well as evaporative distillation for the production of potable water. The hybrid desalination system includes a recovery system, which may be a reverse osmosis system, a forward osmosis system, or a combination thereof, for at least partially desalinating a volume of saltwater and outputting a treated fluid. A boiler is in fluid communication with the recovery system for receiving the treated fluid and producing pure water by evaporative desalination. The boiler includes an internal heating coil for passing a heated working fluid therethrough. A collection tank is in communication with to the boiler for receiving the pure water. At least one solar parabolic trough is in fluid communication with the internal heating coil of the boiler for heating the heated working fluid.

10 Claims, 6 Drawing Sheets

(51) Int. Cl.
    *B01L 3/02*         (2006.01)
    *B01D 61/12*     (2006.01)
    *B01D 3/42*      (2006.01)
    *B01D 1/00*      (2006.01)
    *B01D 3/14*      (2006.01)
    *B01D 61/00*     (2006.01)
    *B01D 61/02*     (2006.01)
    *B01D 61/58*     (2006.01)
    *C02F 103/08*    (2006.01)
    *C02F 103/00*    (2006.01)

(52) U.S. Cl.
    CPC .... *C02F 2103/007* (2013.01); *C02F 2103/08* (2013.01); *C02F 2201/009* (2013.01); *Y02A 20/128* (2018.01); *Y02A 20/129* (2018.01); *Y02A 20/211* (2018.01); *Y02A 20/212* (2018.01)

(56) References Cited

U.S. PATENT DOCUMENTS

| | | | |
|---|---|---|---|
| 6,391,162 B1* | 5/2002 | Kamiya | C02F 1/14 203/11 |
| 6,804,962 B1* | 10/2004 | Prueitt | B01D 1/0047 60/641.8 |
| 8,043,499 B2 | 10/2011 | Saeed et al. | |
| 8,246,786 B2* | 8/2012 | Cap | B01D 1/0035 202/82 |
| 8,795,531 B2* | 8/2014 | Takeuchi | B01D 61/58 210/639 |
| 9,278,315 B2* | 3/2016 | Davis | B01D 1/0035 |
| 9,834,454 B2* | 12/2017 | Frolov | B01D 1/0047 |
| 9,834,455 B2* | 12/2017 | Frolov | B01D 1/0047 |
| 2004/0219400 A1 | 11/2004 | Al-Hallaj et al. | |
| 2010/0270170 A1 | 10/2010 | Rosenbaum | |
| 2011/0198208 A1* | 8/2011 | Olwig | C02F 1/048 203/10 |
| 2012/0325290 A1* | 12/2012 | Gizara | F03G 6/00 136/248 |
| 2013/0168224 A1* | 7/2013 | Godshall | B01D 1/0035 203/10 |
| 2014/0290247 A1* | 10/2014 | Mishima | B01D 3/065 60/641.9 |
| 2015/0143806 A1* | 5/2015 | Friesth | F24S 25/50 60/517 |
| 2016/0002073 A1* | 1/2016 | Nowosielski-Slepowron | B01D 61/58 210/644 |
| 2017/0275182 A1* | 9/2017 | Alshahrani | C02F 1/14 |

* cited by examiner

HYBRID DESALINATION SYSTEM

CROSS-REFERENCE TO RELATED APPLICATION

This application claims the benefit of U.S. Provisional Patent Application Ser. No. 62/289,275, filed on Jan. 31, 2016.

BACKGROUND OF THE INVENTION

1. Field of the Invention

The present invention relates to water treatment and desalination, and particularly relates to a hybrid desalination system combining osmotic fluid treatment with evaporative distillation.

2. Description of the Related Art

Humans generally consume relatively large amounts of water throughout the day. In certain areas of the world, such as in developing nations, access to clean fresh water can be problematic. Further, a large amount of the water that is available on the Earth is in the form of saltwater. Unfortunately, this saltwater is not suitable for human consumption because of the high salt content, which can dehydrate a person if consumed. Further, saltwater cannot be used for irrigation purposes, such as for raising crops.

One possible approach in utilizing saltwater is desalination, a process in which the salt is removed from the water. Through desalination systems and processes, saltwater can be turned into potable drinking water for human consumption and for use in irrigation. Various desalination systems and processes are known. One common form of desalination involves the boiling of saltwater, which in turn produces water vapor. This water vapor can then be condensed back into potable water. While this form of desalination can be relatively easy to implement, it can have difficulties in producing enough water to meet demand.

Other approaches and systems for desalination have certain drawbacks as well. For example, current desalination systems can be relatively expensive and complex, making their implementation difficult in developing countries that have a lack of resources. Additionally, some desalination systems require manual operation, which can require continual support. Therefore, it would be desirable to provide a water desalination system that can be relatively easy to implement, operate, and maintain, which is readily affordable, and which can provide potable water for both consumption and irrigation. Thus, a hybrid desalination system addressing the aforementioned problems is desired.

SUMMARY OF THE INVENTION

The hybrid desalination system is a desalination system for seawater or the like which uses both filtering and treatment from a reverse osmosis filter system or the like as well as evaporative distillation for the production of potable water. The hybrid desalination system includes a recovery system, which may be a reverse osmosis system, a forward osmosis system, a combination thereof or the like, for at least partially desalinating a volume of saltwater and outputting a treated fluid. A boiler is in fluid communication with the recovery system for receiving the treated fluid and producing pure water by evaporative desalination. The boiler includes an internal heating coil for passing a heated working fluid therethrough. A collection tank is in communication with the boiler for receiving the pure water. At least one solar parabolic trough heater is in fluid communication with the internal heating coil of the boiler for heating the heated working fluid.

In an alternative embodiment, the recovery system produces both treated fluid and partially treated fluid. The treated fluid is directly stored in the collection tank, and the partially treated fluid is delivered to the boiler. In this embodiment, an auxiliary heater may be provided for additional heating of the brine circulating through the internal heating coil of the boiler and passing through the at least one solar parabolic trough heater. The auxiliary heater may be powered by a separate photovoltaic panel, conventional utility electrical power or the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
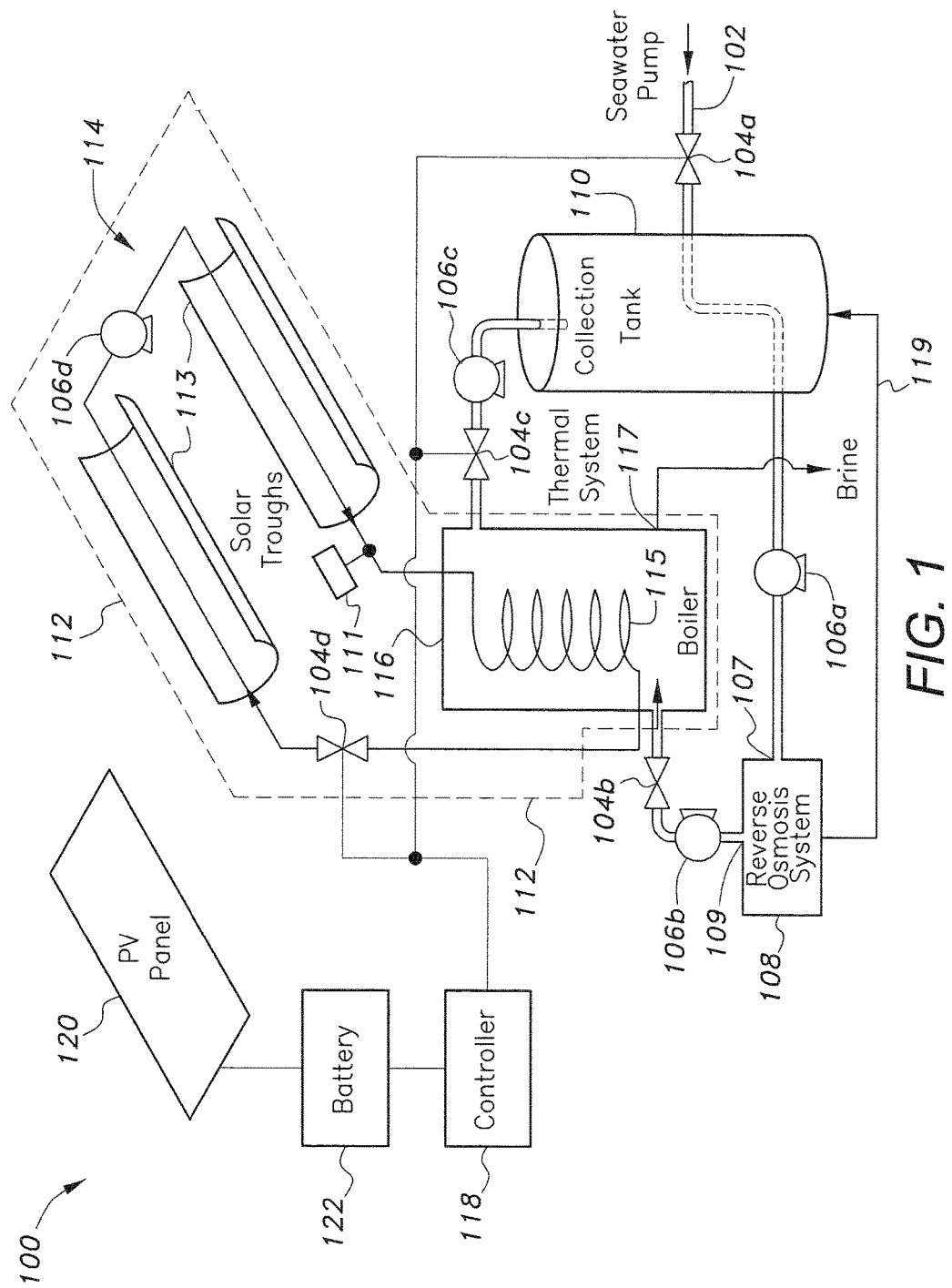
FIG. 1 diagrammatically illustrates a hybrid desalination system according to the present invention.

Referring now to FIG. 1, a hybrid desalination system 100 is shown which includes a fluid intake 102 for receiving untreated fluid from a fluid source (such as seawater, for example) and transporting the untreated fluid from the source to a recovery system 108. As shown in FIG. 1, the fluid intake 102 can be a seawater pump and the untreated fluid can be seawater, saltwater, fresh water, or any other liquid suitable for human consumption, although it should be understood that any suitable type of fluid may be treated, and that fluid intake 102 may be adapted for receiving and transporting any suitable type of fluid to be treated. The source of the untreated fluid can be, for example, a reservoir, a lake, a sea, or any other suitable body of fluid. It should be further understood that any suitable type of intake pump or the like may be utilized for delivering the untreated fluid into system 100.

The hybrid desalination system 100 includes valves 104a, 104b, 104c and 104d and pumps 106a, 106b, 106c and 106d, as shown in FIG. 1, so that the fluid can be transported to and throughout the system 100. The untreated fluid is transported from the source to a recovery system 108 that includes an input 107 to receive the untreated fluid and, following treatment/filtering thereof, outputs the fluid via an output 109. The recovery system 108 can include a reverse osmosis system and/or a forward osmosis system. In FIG. 1, valve 104a is shown controlling input flow through seawater pump/fluid intake 102, and a pump 106a is shown as delivering the fluid to the recovery system 108 for filtering and/or treatment thereof. It should be understood that any suitable type of pumps and valves may be utilized, and that the valves and pumps may be positioned in any suitable portion of the fluid path. It should be noted that a portion of the filtered and/or treated fluid output from recovery system 108 may have sufficient desired purity to be collected at this point, either via return line 119, as shown, which leads to the final collection tank 110, or to any other desired collection tank, conduit or the like. Additionally, it should be understood that the inclusion of reverse osmosis system 108 in FIG. 1 is only one example of fluid recovery, and that recovery system 108 may alternatively be a forward osmosis system, a combination of reverse osmosis and forward osmosis, or any other desired fluid purification and treatment system.

As shown in FIG. 1, the recovery system 108 can be a reverse osmosis system. The recovery system may include any conventional permeable membrane apparatus as are well known in reverse osmosis processes, although it should be understood that any suitable type of filtering and/or treatment system may be used. At the recovery system 108, the untreated fluid undergoes a reverse osmosis process so that a range of about 5%-25% of potable fluid will be recovered from the untreated fluid. Additionally, to assist in recovery, the untreated fluid can be preheated by using brine to a temperature of about 35° C. As will be described in greater detail below, a boiler 116 outputs heated brine as a recoverable waste product, and this heated brine may be used to preheat the untreated fluid to raise its temperature prior to treatment in recovery system 108.

Under applied pressure from pump 106b, and under control of valve 104b, the treated fluid is passed to boiler 116 where, through heating and evaporation, the treated fluid is further desalinated (in the case of seawater or other types of saltwater) via evaporative distillation. As is conventionally known, pure water vapor is produced by heating the fluid, through evaporation of the pure water, and the pure water vapor is then condensed into liquid water. The resultant purified liquid water is collected in collection tank 110, under the action of pump 106c and under the control of valve 104c. It should be understood that boiler 116 may include any suitable type of condenser for condensing the heated water vapor, or any suitable type of condenser may be used in addition to boiler 116. The remaining brine collected in boiler 116 may be extracted via drain 117.

As shown in FIG. 1, the boiler 116 may form part of an overall thermal system 112, along with a separate thermal generator 114. As shown, the thermal generator 114 may include a plurality of solar parabolic troughs 113, among other commonly available thermal generators, that can create thermal energy. Although only a pair of solar troughs 113 are shown in FIG. 1, it should be understood that any desired number may be utilized. It should be understood that boiler 116 may be any suitable type of boiler, distillation system or the like. As shown, a temperature sensor 111, which may be any suitable type of temperature sensor, may be used to ensure that the exit temperature is greater than a desired temperature value (corresponding to steps 306 and 308 in FIG. 3, as will be described in detail below). It should be understood that solar parabolic troughs 113 are shown for exemplary purposes only, and that any suitable type of heater, powered by utility power or the like, may be used.

Fluid, under the power of pump 106d and under control of valve 104d, is drawn through the solar parabolic troughs 113, where it is heated by sunlight, as is conventionally known, and delivered back through a coil 115 of boiler 116, providing the source of heat in boiler 116. As noted above, typically only 5%-25% of potable fluid can be recovered by the recovery system, and a remaining brine moves into the thermal section or boiler 116. A remaining brine from boiler 116, may be collected and used as the fluid passing through thermal system 112; i.e., the brine drawn off through outlet 117 of boiler 116 may be collected or diverted for usage as the working fluid passing through the troughs 113 and the internal coil of boiler 116.

As further shown in FIG. 1, the hybrid desalination system 100 also preferably includes a controller 118. The controller 118 controls and directs the operation of the various components of the hybrid desalination system 100. For example, the controller 118 can control the fluid intake 102, the recovery system 108, the collection tank 110, and the thermal system 112, along with any other desired components of the hybrid desalination system 100, such as controlling the valves 104a-104d and the pumps 106a-106d. The controller 118 can be any suitable controller, such as a programmable logic controller, a personal computer or the like.

The controller 118 can be implemented and programmed to automate the entire hybrid desalination system 100. Also included in the hybrid desalination system 100 are various power generators. For example, as shown in FIG. 1, a solar power generator 120 may be provided, such as one or more photovoltaic panels, for powering controller 118 and the various electrical components of system 100. In addition to the solar power generator 120, a battery 122 can also be implemented in conjunction with the hybrid desalination system 100. The battery 122 can be any common stored power source. The solar power generator 120 and/or the battery 122 can power all the components of the hybrid desalination system 100, including but not limited to the fluid intake 102, the recovery system 108, the collection tank 110, the thermal system 112 including the thermal generator 114 and the boiler 116, and the controller 118. Preferably, battery 122 is rechargeable, allowing the photovoltaic (PV) panel 120 to be used for charging battery 122.

Figure 2:
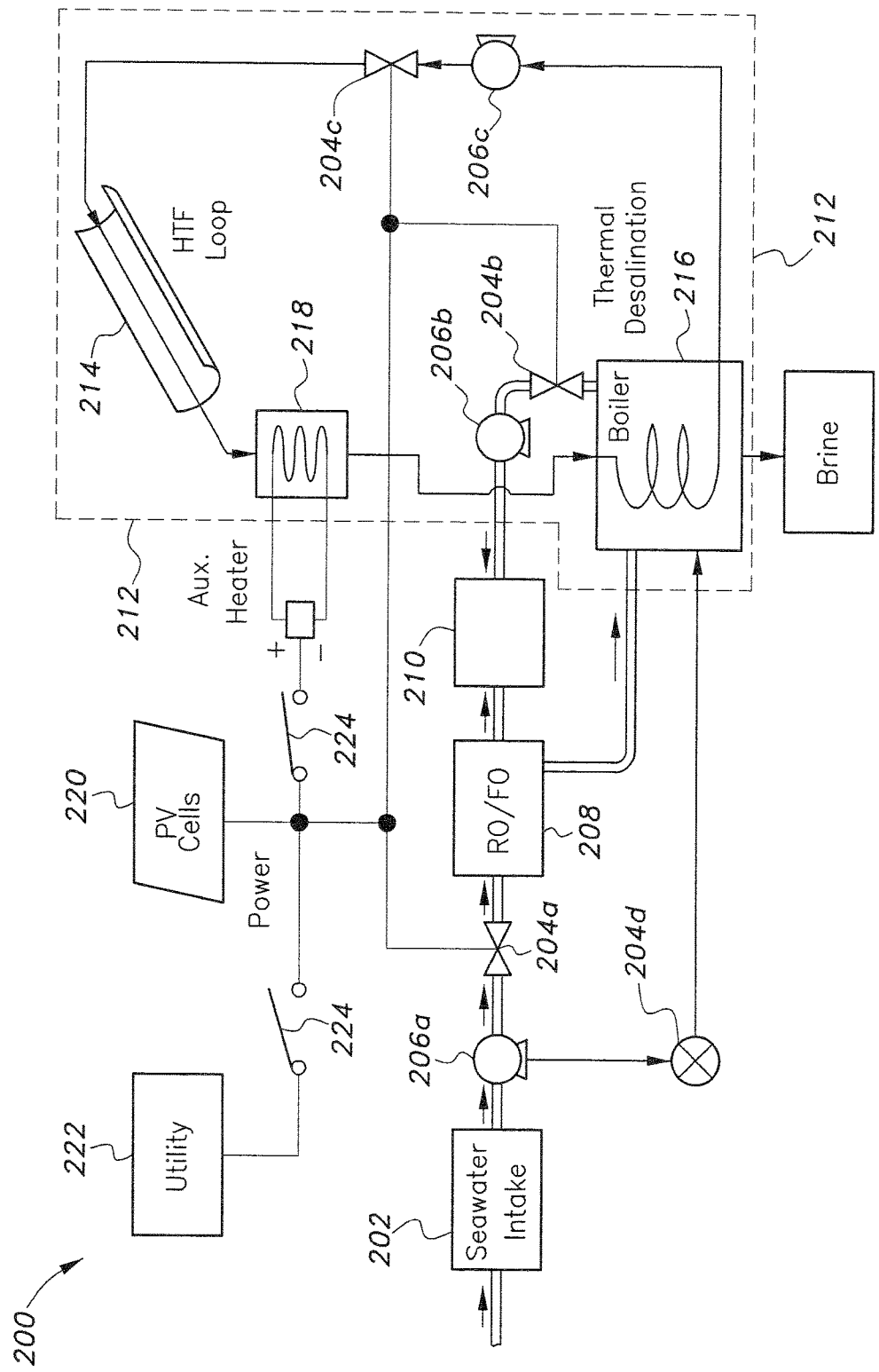
FIG. 2 diagrammatically illustrates an alternative embodiment of the hybrid desalination system.

The alternative hybrid desalination system 200 of FIG. 2 is similar to the hybrid desalination system 100 shown in FIG. 1, with the hybrid desalination system 200 of FIG. 2 including many of the same structures and components, such as a fluid/seawater intake 202, and a plurality of pumps 206a, 206b, 206c, and a plurality of valves 204a, 204b, 204c to transport the fluid into and throughout the system 200. A recovery system 208, such as a reverse osmosis/forward osmosis (RO/FO) filtering system or the like, receives the untreated fluid from the fluid intake 202. It should be understood that recovery system 208 may be a reverse osmosis filtering system, a forward osmosis filtering system, or both. Similar to the system of FIG. 1, the untreated fluid can be preheated with brine to a temperature of about 35° C. so as to help with recovery of potable fluid. Similar to that of system 100, the recovery of potable fluid by the recovery system 208 will be in a range of about 5%-25%.

As shown in FIG. 2, the recovered potable fluid is delivered to collection tank 210, and the remainder of the fluid is delivered to boiler 216 for further separation into pure water vapor and brine, similar to the evaporative process described above with regard to operation of boiler 116. Additionally, as shown, a portion of untreated seawater may also be diverted, by check valve 204d, for delivery directly to boiler 216 for evaporative desalination. Similar to system 100, system 200 also includes an overall thermal system 212, including boiler 216 and at least one thermal generator 214, which may similarly be at least one solar parabolic trough.

However, thermal generator 214 may also include a heat transfer fluid (HTF) loop, in which pump 206c, under flow control of valve 204c, is used to circulate the HTF through a solar thermal collection loop. The thermal generator 214 will thermally activate the boiler 216 so that the fluid within the boiler 216 can be boiled into a vapor. The vapor, once again, will be turned into condensation which is collected as potable liquid. This potable liquid will be transported to the collection tank 210.

Similar to the system 100 of FIG. 1, the system 200 of FIG. 2 can also include a logic controller or the like to control and operate the various components of the system 200. The hybrid desalination system 200 of FIG. 2 can be powered by solar power generator 220 and/or a common electrical utility 222. As shown in FIG. 2, the solar power generator can be PV cells, panels or the like. However, unlike system 100, the system 200 may include switches 224 to control the flow of power from the utility 222 and the solar power generator 220. This can allow a user to select the desired power source for system 200. Further, as shown, an auxiliary heater 218, under control of switches 224 and/or the system controller, may be provided for providing additional heat to the fluid being heated by thermal generator 214.

Referring to FIGS. 3-6, flow diagrams of algorithms 300, 400, 500 and 600, which are implemented by the controller, such as controller 118, are shown. The controllers can control and operate the systems 100 and 200 of FIGS. 1 and 2, respectively, depending on the sequence of events illustrated in algorithms 300, 400, 500 and 600. For example, the controller 118 can determine the power requirements of the system 100 (step 302). Depending on the power requirements, auxiliary power may be supplied to the system 100 or not. If, for example, the reverse osmosis system needs activation, the solar generator 120 can be activated to supply PV power. Another area of control exhibited by the controller 118 depends on the temperature and pressure of the fluid. For example, depending on the exit temperature ($T_{exit}$) of the fluid, the recovery system 108 or the thermal system 112 can be activated.

Figure 3:
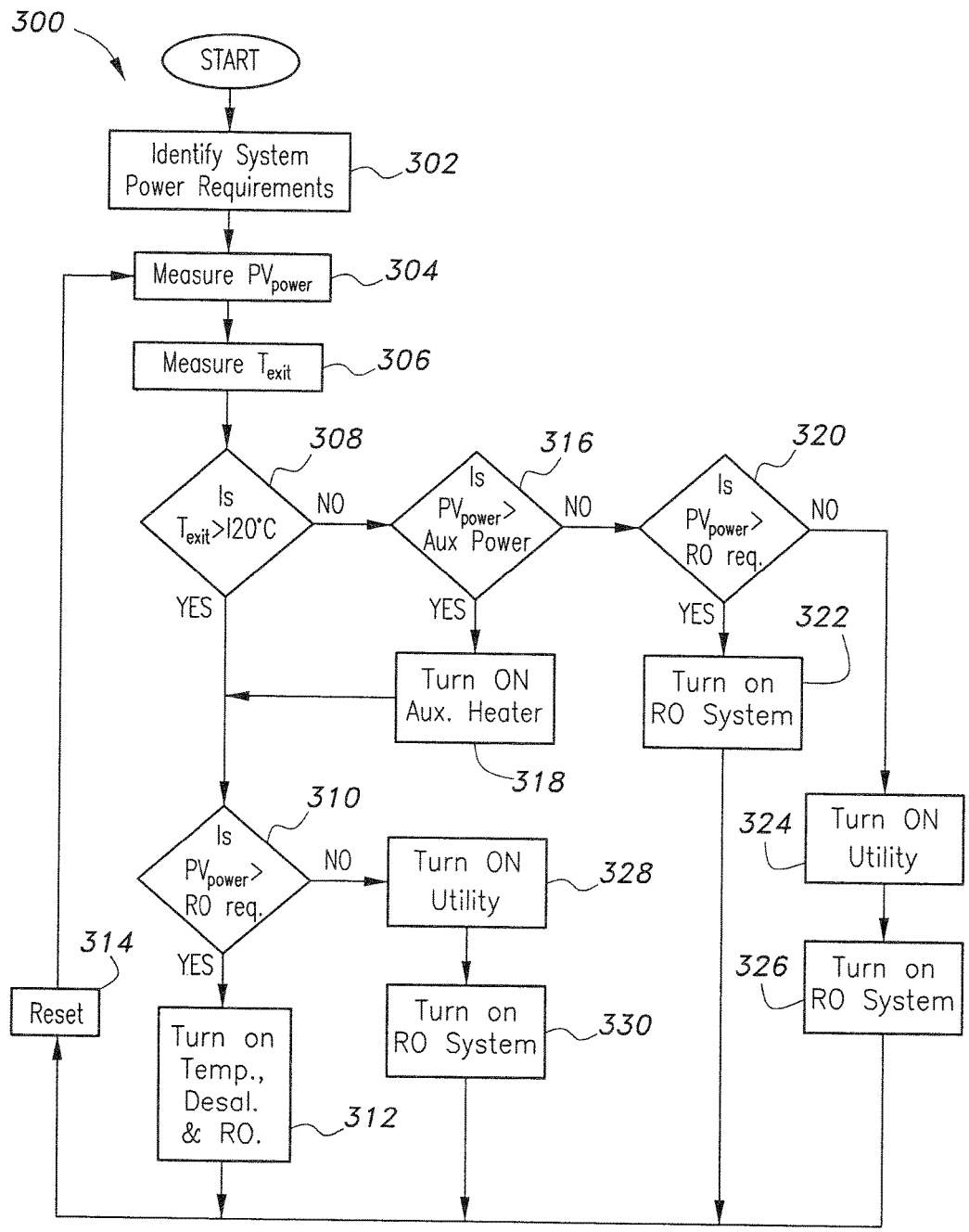
FIG. 3 is a flow diagram illustrating process steps of a control algorithm for the hybrid desalination system.

In FIG. 3, the photovoltaic power $PV_{power}$ is measured at step 304 and the exit temperature $T_{exit}$ is measured at step 306. In this particular example, a threshold temperature of 120° C. is set (step 308). If the exit temperature is greater than this threshold temperature, then flow moves to step 310, where it is determined if the power produced by the PV panels is sufficient to power the reverse osmosis filtering system. At step 312, the desalination process may then begin. The logic flow is then reset (at step 314) and the process begins again.

If, however, at step 108, the exit temperature does not meet the threshold temperature, then, at step 316, it is determined if the power provided by the PV panels is greater than the auxiliary power available (from the battery 122). If so, then at step 318, the auxiliary heater 218 is turned on, and logic flow returns to step 310. If not, then logic flow proceeds to step 320, where it is determined if the PV power meets the power requirements of the reverse osmosis filtering system. If so, then reverse osmosis filtering begins at step 322. If not, then power is supplied by utility supply 222 (step 324) and reverse osmosis filtering begins at step 326. Returning to step 310, if the PV power is not sufficient for powering the reverse osmosis filtering system, then the power is supplied by the utility supply 222 (step 328) to implement reverse osmosis filtering (step 330). It should be understood that the user may not wish to switch power to the utility supply 222 at steps 324 and 328, thus the user may make a decision at these points to either allow the power source to be switched to utility power or, depending on the user's actual need for the production of purified water, simply return to the reset state at 314.

Figure 4:
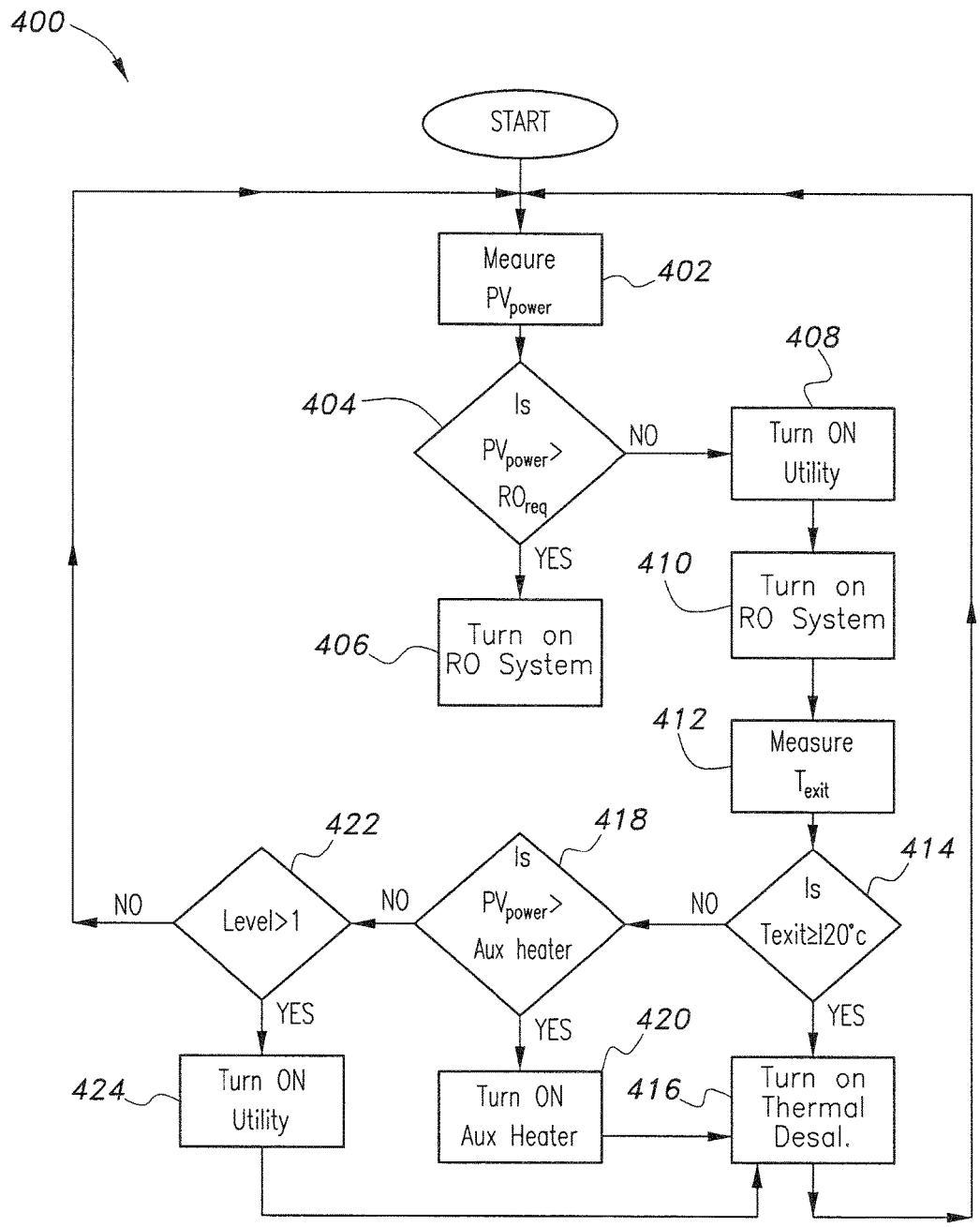
FIG. 4 is a flow diagram illustrating process steps of an alternative control algorithm for the hybrid desalination system.

In the alternative algorithm 400 of FIG. 4, the PV power is measured at step 402. If the PV power is sufficient to operate the reverse osmosis filtering system (step 404), then reverse osmosis filtering is begun at step 406. If not, power is supplied by utility supply 222 (step 408) and reverse osmosis filtering is implemented at step 410. At step 412, the exit temperature of the fluid is measured and it is determined if the exit temperature meets a threshold value of 120° C. in this example (step 414). If so, then the thermal desalination process begins at step 416. If not, then it is determined at step 418 if the PV power is greater than the auxiliary power available. If so, then the auxiliary heater 218 is turned on (step 420) for thermal desalination at step 416. If the PV power is less than the auxiliary power available then, at step 422, a level value equal to 1 indicates that thermal desalination is not needed. A level value greater than 1 indicates that thermal desalination is needed. In the latter case, at step 424, power is provided by the utility power supply 222, and thermal desalination proceeds at step 416. It should be understood that the user may not wish to switch power to the utility supply 222 at step 408, thus the user may make a decision at this point to either allow the power source to be switched to utility power or, depending on the user's actual need for the production of purified water, simply return to a reset state.

Figure 5:
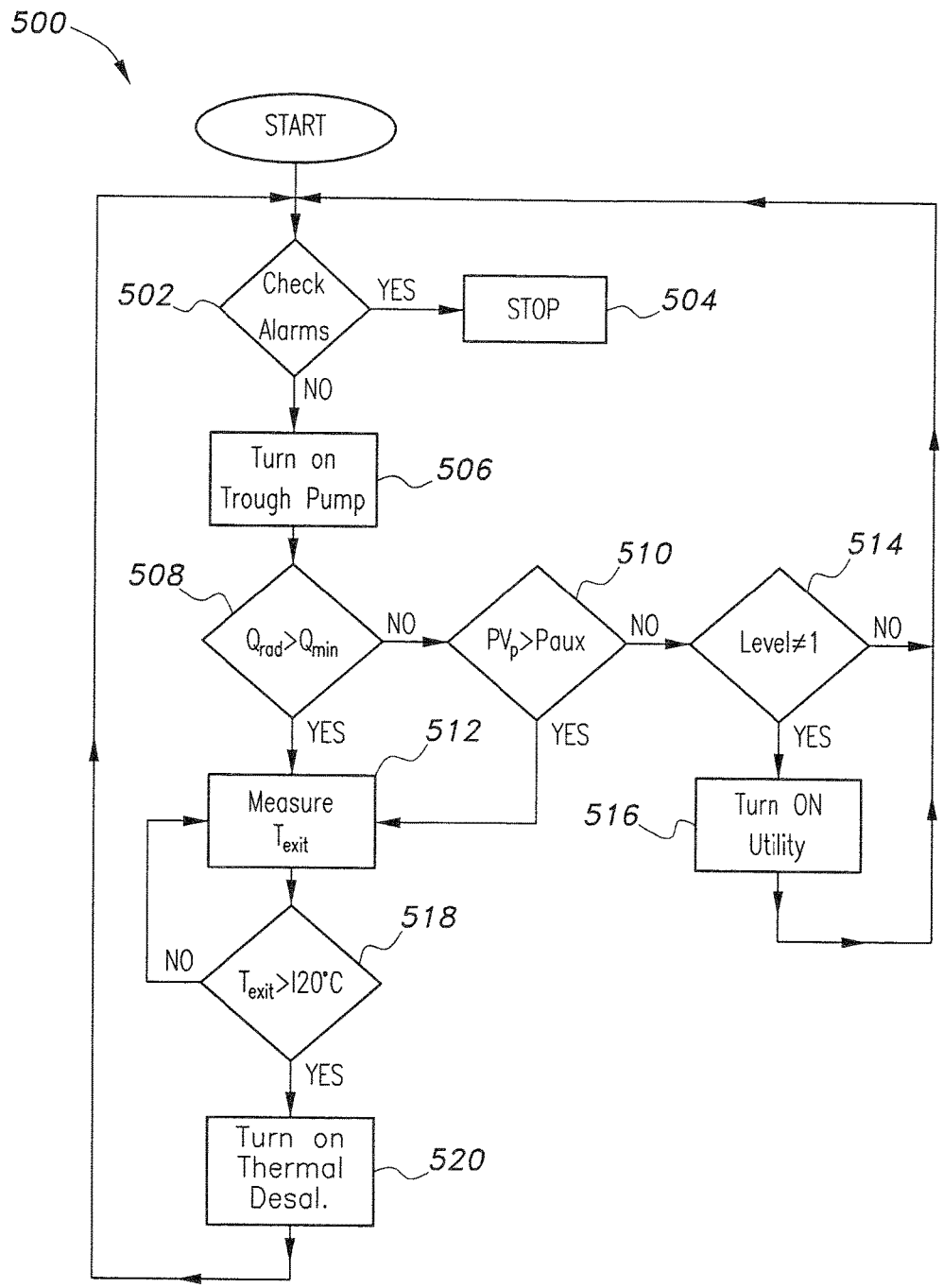
FIG. 5 is a flow diagram illustrating process steps of a further alternative control algorithm for the hybrid desalination system.

As shown in the alternative control algorithm 500 of FIG. 5, alarm conditions may be utilized (step 502) to stop operation (step 504) if measured temperatures or any other parameters exceed pre-set safety thresholds. Here, the solar power system using solar parabolic troughs 113/214 is focused on, with the respective fluid pumps 106d/206c being turned on at step 506. If the thermal energy from the radiant heat source ($Q_{rad}$) meets a minimum energy threshold value ($Q_{min}$), then the fluid exit temperature $T_{exit}$ is measured at step 512. If the thermal energy from the radiant heat source ($Q_{rad}$) does not exceed the minimum energy value ($Q_{min}$), at step 508, then, at step 510, it is determined if PV power is greater than the auxiliary power available. If so, logic flow proceeds to step 512. If not, then a determination is made at step 514, similar to step 422 of FIG. 4; i.e., a level value equal to 1 indicates that thermal desalination is not needed. A level value greater than 1 indicates that thermal desalination is needed. If the level value is greater than 1, then utility power source 222 is utilized at step 516. Returning to step 512, once the exit temperature is measured, step 518 ensures that the fluid is heated to a minimum threshold (120° C. in this example) before thermal desalination is allowed to begin at step 520. In the above embodiments, 120° C. has been used as an exemplary desired threshold temperature. It should be understood that 120° C. is an exemplary temperature only, and that the minimum threshold temperature may be varied dependent upon varying environmental conditions, system parameters, etc.

Figure 6:
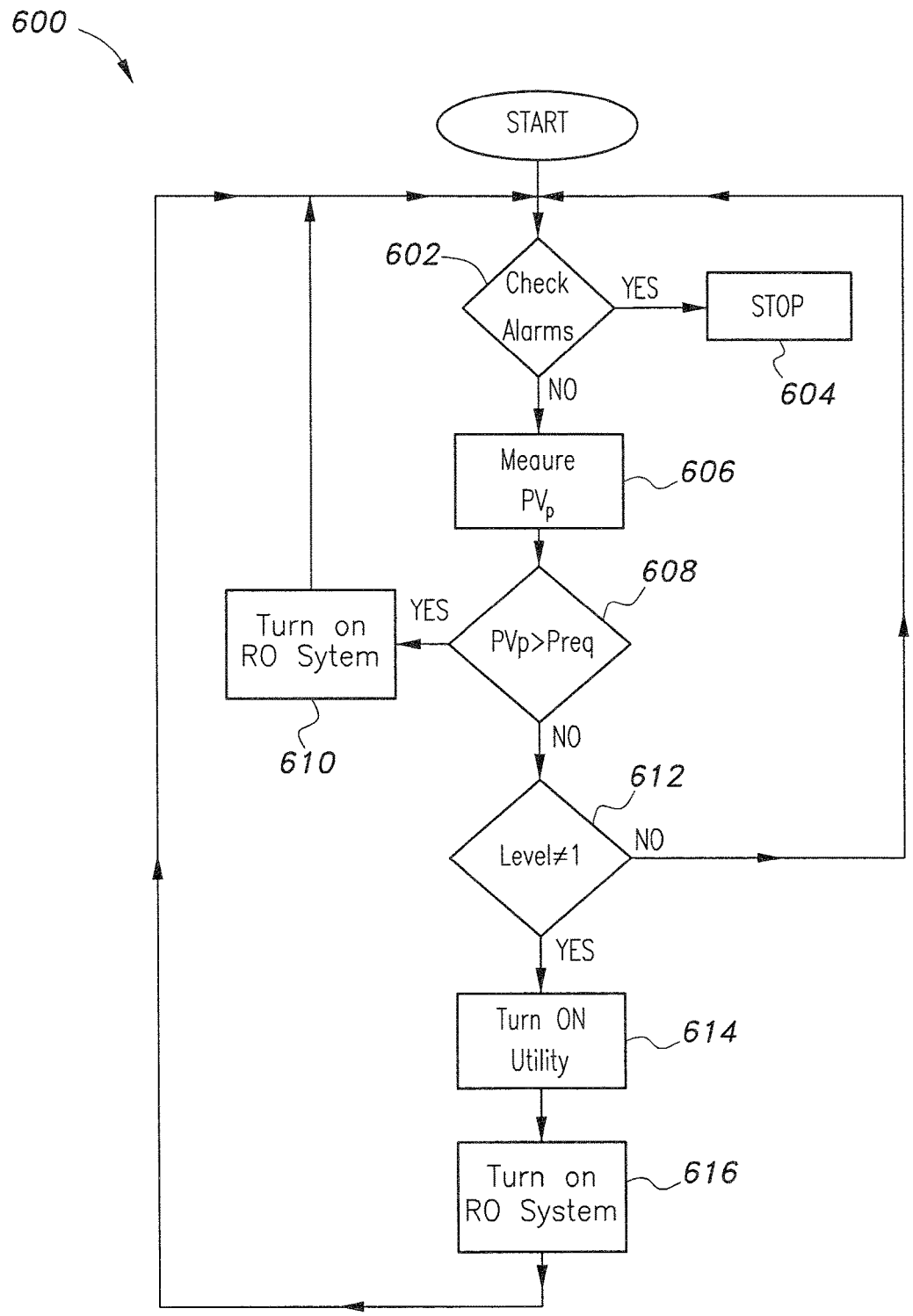
FIG. 6 is a flow diagram illustrating process steps of another alternative control algorithm for the hybrid desalination system.

In the alternative control algorithm 600 of FIG. 6, alarm conditions are once again used to stop the process, if necessary (steps 602 and 604), similar to control algorithm 500. At step 606, the PV power is measured and at step 608, it is determined if the PV power meets the required power ($P_{req}$) to operate the reverse osmosis filtering system (step 610). If not, then at step 612, a level 1 determination is made, similar to that of control algorithms 400 and 500; i.e., a level value equal to 1 indicates that thermal desalination is not needed. A level value greater than 1 indicates that thermal desalination is needed. If the level value is greater than 1, then utility power source 222 is utilized at step 614 for implementing reverse osmosis filtering (step 616).

It is to be understood that the present invention is not limited to the embodiments described above, but encompasses any and all embodiments within the scope of the following claims.

We claim:

1. A hybrid desalination system, comprising:
   a recovery system for partially desalinating a volume of saltwater and outputting a volume of treated water and a volume of partially treated fluid, wherein the volume of treated water is between 5%-25% of the volume of saltwater;
   a boiler in direct, sequential fluid communication with the recovery system for directly receiving the partially treated fluid and producing pure water by evaporative desalination, wherein the boiler includes an internal heating coil for passing a heated working fluid therethrough;
   a collection tank in direct fluid communication with both the boiler and the recovery system for receiving the pure water and the 5%-25% volume of treated water, respectively;
   means for heating the heated working fluid in fluid communication with the internal heating coil of the boiler;
   a power source for powering the system, the power source comprising at least one of a solar power generator, an electrical utility, and a battery;
   an auxiliary heater for selectively providing additional heat to the heated working fluid, wherein the auxiliary heater generates heat by power from the power source, wherein the heated working fluid is at 120° C.; and
   a controller operatively connected to the hybrid desalination system and powered by the power source, wherein the controller selectively measures, determines and activates at least:
   a) power requirements for the hybrid desalination system;
   b) power produced at the power source;
   c) temperature at the recovery system;
   d) power produced by the power source being sufficient to power at least the recovery system; and
   e) desalination process.

2. The hybrid desalination system as recited in claim 1, wherein said recovery system is selected from the group consisting of a reverse osmosis filtering system, a forward osmosis filtering system, and a combination thereof.

3. The hybrid desalination system as recited in claim 1, wherein the means for heating the heated working fluid comprises at least one solar parabolic trough heater.

4. The hybrid desalination system as recited in claim 1, further comprising:
   a first pump for inputting the volume of saltwater into the recovery system; and
   a first valve for selectively controlling flow of the volume of saltwater into the recovery system.

5. The hybrid desalination system as recited in claim 4, further comprising a second pump for inputting the pure water into the collection tank.

6. The hybrid desalination system as recited in claim 5, further comprising a second valve for selectively controlling flow of the pure water into the collection tank.

7. The hybrid desalination system as recited in claim 6, further comprising a third pump for circulating the heated working fluid through the means for heating the heated working fluid and the internal heating coil of the boiler.

8. The hybrid desalination system as recited in claim 7, further comprising a third valve for selectively controlling flow of the heated working fluid circulating through the means for heating the heated working fluid and the internal heating coil of the boiler.

9. The hybrid desalination system as recited in claim 1, further comprising a check valve for selectively controlling flow of a volume of untreated saltwater into said boiler for evaporative distillation thereof.

10. The hybrid desalination system as recited in claim 1, wherein the boiler outputs heated brine as a recoverable waste product, further wherein the heated brine is used to preheat the untreated fluid to raise its temperature to 35° C. prior to treatment in the recovery system.

* * * * *